United States Patent [19]
Fukano et al.

[11] Patent Number: 5,967,414
[45] Date of Patent: Oct. 19, 1999

[54] SUCK BACK VALVE

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 09/021,399

[22] Filed: Feb. 10, 1998

[30] Foreign Application Priority Data

Mar. 5, 1997 [JP] Japan ................................. 9-050016

[51] Int. Cl.$^6$ .................................................. B05B 15/02
[52] U.S. Cl. ......................... 239/119; 239/106; 222/571; 251/63.5; 251/331
[58] Field of Search .................................... 239/104, 106, 239/119, 583, 586; 222/571; 251/63.5, 331, 129.15

[56] References Cited

U.S. PATENT DOCUMENTS

| | | | |
|---|---|---|---|
| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 5,134,962 | 8/1992 | Amada et al. | 222/571 X |
| 5,386,849 | 2/1995 | Gilchrist et al. | 251/331 X |
| 5,423,482 | 6/1995 | Mueller et al. | 239/119 X |

FOREIGN PATENT DOCUMENTS 8-10399  3/1996  Japan .

*Primary Examiner*—Andres Kashnikow
*Assistant Examiner*—Steven J. Ganey
*Attorney, Agent, or Firm*—Oblon, Spivak. McClelland, Maier & Neustadt, P.C.

[57] ABSTRACT

A suck back valve includes a fitting having a fluid passage formed with a first port at one end thereof and a second port at another end, a valve actuator having a suck back mechanism for sucking a fluid from inside the fluid passage according to a negative pressure action of a diaphragm displaced by a pilot pressure, and first and second electromagnetic valves which increase/reduce the pilot pressure supplied to a diaphragm chamber in accordance with supply and discharge actions. A controller is provided for energizing and deenergizing the first and second electromagnetic valves, wherein said fitting, said actuator and said controller are assembled together as an integral unit.

9 Claims, 5 Drawing Sheets

SUCK BACK VALVE

BACKGROUND OF THE INVENTION

1. Field of the Invention

The present invention relates to a suck back valve which makes it possible, for example, to avoid liquid drip from a liquid supply port by sucking a predetermined amount of a fluid flowing through a fluid passage in accordance with a displacement action of a diaphragm.

2. Description of the Related Art

The suck back valve has been hitherto used, for example, in a production process for forming semiconductor wafers. The suck back valve has a function to prevent so-called liquid drip, i.e. a phenomenon in which a minute amount of coating liquid drips toward the semiconductor wafer from a supply port when the supply of coating liquid to the semiconductor wafer is stopped.

A suck back valve according to a conventional technique is shown by FIG. 5, further details of which may be seen, for example, in Japanese Utility Model Publication No. 8-10399.

The suck back valve 1 includes a main valve body 5 formed with a fluid passage 4 for making communication between a fluid-introducing port 2 and a fluid-discharging port 3, and a bonnet 6 coupled to an upper portion of the main valve body 5. A diaphragm 7, which comprises a thick walled section and a thin-walled section, is provided at a central portion of the fluid passage 4. The bonnet 6 is formed with a pressurized fluid supply port 8 which is connected to an unillustrated pressurized fluid supply source and to which a pressurized fluid is supplied in accordance with a changeover action of a directional control valve.

A piston 9 is fitted to the diaphragm 7, wherein a v-packing 10, which is slidable on an inner wall surface of the main valve body 5 and which functions as a seal, is installed on the piston 9. Further, a spring 11, which constantly presses the piston upwardly, is provided in the main valve body 5. Reference numeral 12 indicates a screw member which abuts against the piston 9 to adjust the displacement amount of the piston 9 so that the flow amount of the fluid sucked by the diaphragm 7 can be adjusted.

Operation of the suck back valve 1 shall now be explained in outline. In an ordinary state in which the fluid is supplied from the fluid-introducing port 2 to the fluid-discharging port 3, the piston 9 and diaphragm 7 are displaced downwardly in an integrated manner in accordance with action of the pressurized fluid supplied from the pressurized fluid supply port 8. The diaphragm 7, which is coupled to the piston 9, protrudes into the fluid passage 4 as shown in FIG. 5 by the two-dot chain lines.

When flow of the fluid through fluid passage 4 is halted, the piston 9 and diaphragm 7 are raised in unison under the action of the elastic force exerted by the spring 11, by stopping the supply of pressurized fluid from the pressurized fluid supply port 8. A predetermined amount of fluid remaining in the fluid passage 4 is sucked under action of a negative pressure produced by the diaphragm. Thus, dripping of liquid, which would otherwise be caused at an unillustrated fluid supply port, is prevented.

Incidentally, in the suck back valve according to the above-described conventional technique, for precise adjustment of the flow rate of pressurized fluid supplied to the pressurized fluid supply port, a fluid flow control device 14 is connected through a conduit 13, for example a tube. The flow control device 14 is formed separately from the suck back valve 1, and in addition to preventing pressure variations in the pressurized fluid supplied with respect to the pressurized fluid supply port of the suck back valve, also provides a function to control flow rate of the pressurized fluid supplied to the pressurized fluid supply port 8.

However, when using the suck back valve according to this conventional technique, an operation for interconnecting supply pipes between the suck back valve and the fluid control apparatus 14 becomes necessary, resulting in inconvenience. In addition, a dedicated space for installing the fluid pressure control apparatus 14 separately from the suck back valve 1 becomes necessary, resulting in the disadvantage that the installation space must be increased overall.

Further, as a consequence of the supply pipe (conduit 13) connected between the suck back valve 1 and the fluid pressure control device 14, flow passage resistance increases, with the disadvantage that the precision and responsiveness of the diaphragm is weakened.

SUMMARY OF THE INVENTION

A general object of the invention is to provide a suck back valve in which an operation for connecting a supply pipe between the suck back valve and a fluid control apparatus is unnecessary, thereby minimizing and making effective use of equipment space.

A principal object of the invention is to provide a suck back valve capable of improving precision and responsiveness of a flexible diaphragm for sucking a predetermined amount of a fluid which flows through a fluid passage in accordance with a displacement action of the diaphragm.

The above and other objects, features and advantages of the present invention will become more apparent from the follow description when taken in conjunction with the accompanying drawings in which a preferred embodiment of the present invention is shown by way of illustrative example.

DETAILED DESCRIPTION OF THE PREFERRED EMBODIMENTS

Figure 1:
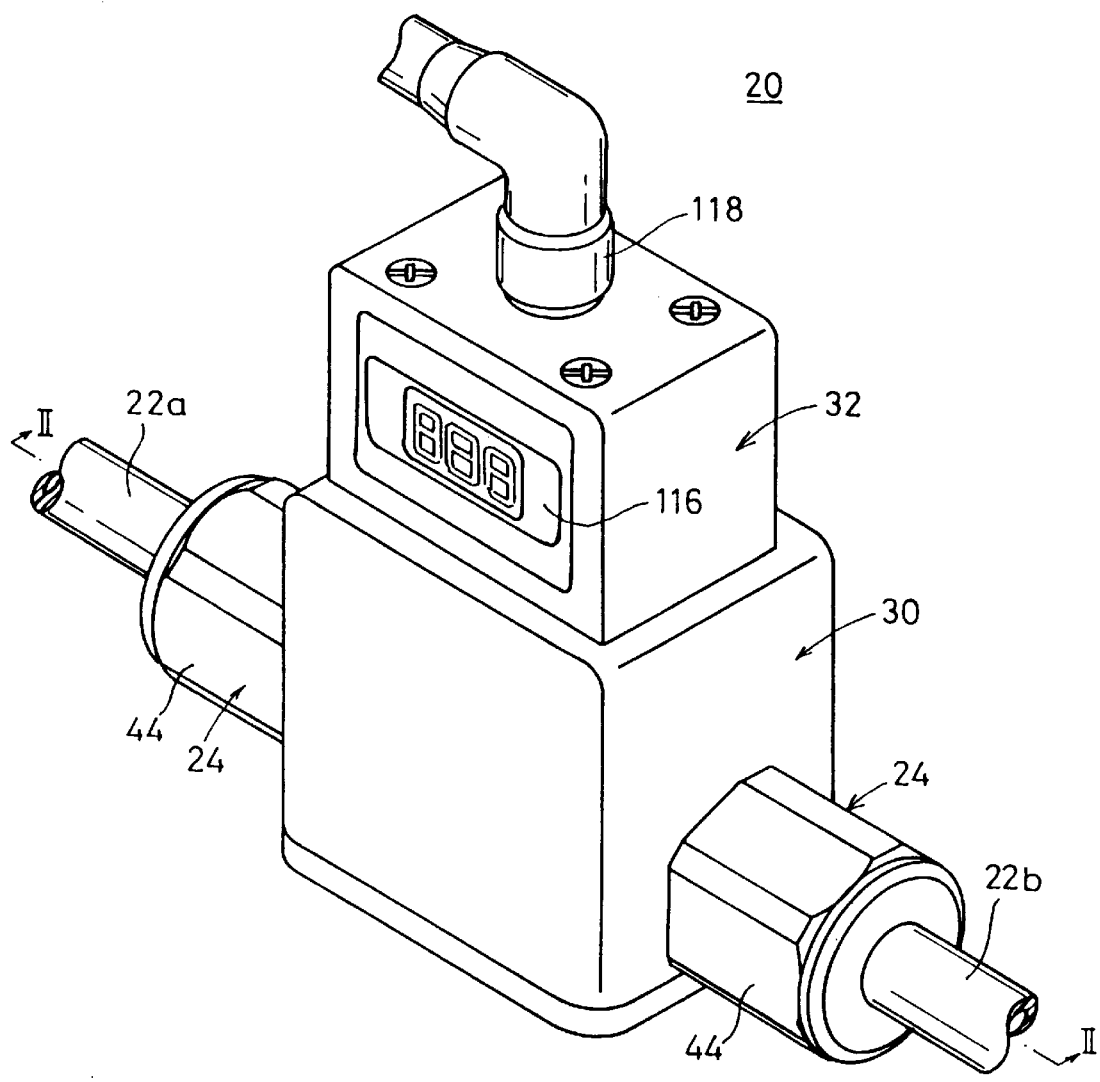
FIG. 1 is a perspective view illustrating a suck back valve according to an embodiment of the present invention.

Reference numeral 20 in FIG. 1 illustrates a suck back valve according to an embodiment of the present invention. The suck back valve 20 is constructed by a fitting 24 to which there are detachably connected a pair of tubes 22a, 22b separated by a fixed distance, an actuator 30 having a suck back mechanism 28 (see FIG. 2) and an ON/OFF valve 26 disposed on top of said fitting 24, and a controller 32 which controls the pressure (pilot pressure) of a pressurized fluid supplied to the suck back mechanism 28. Further, the fitting 24, actuator 30 and controller 32, as shown in FIG. 1, are integrally assembled together.

Figure 2:
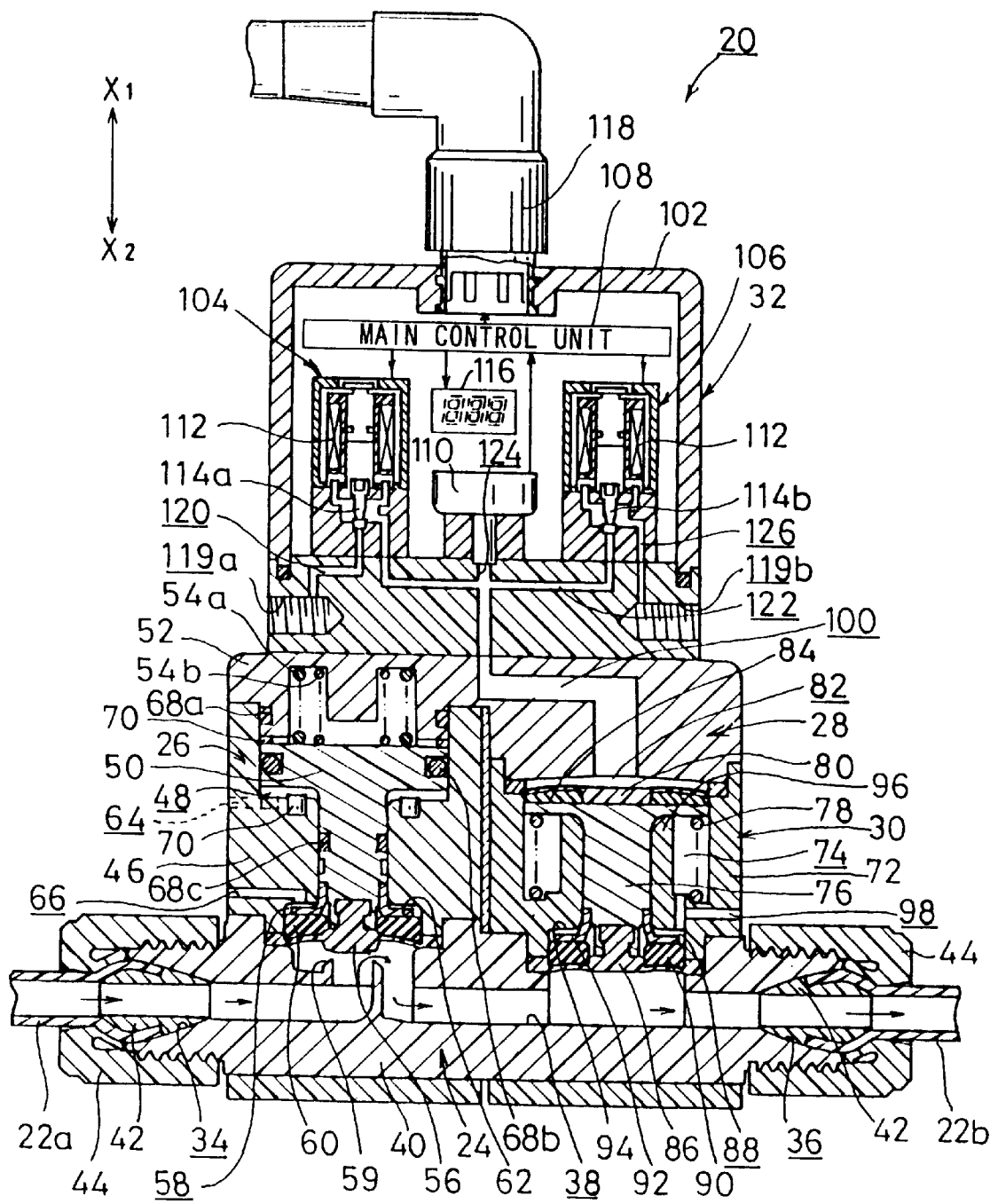
FIG. 2 is a vertical cross-sectional view taken along line II—II of FIG. 1.

As shown in FIG. 2, a first port 34 is formed on one end, and a second port 36 is formed on another end of the fitting 24. In addition, the fitting 24 comprises a coupling body 40 having disposed therein a fluid passage 38 providing communication between the first port 34 and the second port 36, inner members 42 coupled respectively to the first and second ports 34, 36 and inserted into openings of the tubes 22a, 22b, and lock nuts 44 for maintaining a fluid-tight seal at the connecting parts of tubes 22a, 22b by screwing the lock nuts into screw threads engraved into ends of the coupling body 40.

An ON/OFF valve 26 is disposed on an upper part of the fitting 24 in the vicinity of the first port 34. The ON/OFF valve 26 includes a first valve body 46 integrally connected to the coupling body 40, a piston 50 displaceable in directions of arrows $X_1$ and $X_2$ along a cylinder chamber 48 formed on the interior of the first valve body 46, and cover member 52 hermetically fitted into the cylinder chamber 48. The cover member 52 extends over the suck back mechanism 28. Between the piston 50 and the cover member 52, a pair of spring elements 54a, 54b are concentrically installed, wherein due to an elastic force of the spring elements 54a, 54b, the piston is in a condition in which normally it is forced in a downward direction (i.e. the direction of arrow $X_2$).

At a lower end of the piston 50, a first diaphragm chamber 58 is formed in which a first diaphragm 56 is sealingly fitted, the first diaphragm 56 being connected to a lower end of the piston 50 and disposed such that it is displaced in unison with the piston 50. In this case, by separating the first diaphragm 56 from a seat 59 formed in the coupling body 40, and further by seating the first diaphragm 56 onto the seat 59, a function for opening and closing of the fluid passage 38 is performed. Accordingly, switching between a supply condition and a condition for halting supply of the fluid (for example a coating fluid) which flows through the fluid passage 38 can be performed based on an opening/closing action of the ON/OFF valve 26.

In addition, an annular cushioning member 60 is disposed on an upper surface of the first diaphragm 56 for protecting a thin walled portion of the first diaphragm 56, the cushioning element 60 being supported by a cross-sectionally L-shaped support member 62 which is connected to a lower end of the piston 50.

A pressurized fluid inlet/outlet port 64, connected to an unillustrated pressurized fluid supply source, is formed in the first valve body 46 and communicates with a sealing chamber 48. In this case, under a changeover action of an unillustrated directional control valve, a pressurized fluid is supplied to the sealing chamber 48 through the pressurized fluid inlet/outlet port 48, and as a result, the piston 50 is raised upwardly in resistance to the elastic force of spring elements 54a, 54b. Accordingly, the first diaphragm 56 separates a predetermined distance from the seat 59, opening the fluid passage 38, wherein the fluid flows in a direction from the first port 34 to the second port 36.

Further, a passage 66 making communication between the first diaphragm chamber 58 and atmosphere is formed in the first valve body 46. The first diaphragm 56 can be freely operated by supply and discharge of air from inside the diaphragm chamber 58 through the first passage 66. Reference numerals 68a–68c indicate respective seals for preserving airtightness of the sealing chamber 48, whereas reference numeral 70 shows a cushioning member which abuts with the piston 50 serving a cushioning function.

A suck back mechanism 28 is disposed on top of the fitting 24 in proximity to the second port 36. The suck back mechanism 28 includes a second valve body 72 integrally connected to the coupling body 40 and first valve body 46, and a stem 74 displaceable in directions of arrows $X_1$ and $X_2$ along a chamber 76 formed in the interior of the second valve body 72. A spring element 78 is disposed in the chamber 74, which contacts a flange of the stem 76, normally applying force thereto in a upward direction (i.e. direction of arrow $X_1$) due to the elastic force of the spring element 78.

A second diaphragm 80 is extended from an upper part of the stem 76 and connects to an upper surface of the stem 76. A diaphragm chamber (pilot chamber 82) is formed for actuating the second diaphragm 80 by supplying a pilot pressure in an upward direction of the second diaphragm 80. In this case, a cushioning member 84, formed by a rubber material or the like, is interveningly disposed between a thin-walled portion of the second diaphragm 80 and the stem 76.

On the other hand, a third diaphragm chamber 88 is formed at the lower end of the stem 76, which is sealed off by a third diaphragm 86, the third diaphragm 86 being connected to the stem 76 and disposed so as to be displaced in unison with the stem 76.

An annular cushioning member 90 is disposed on an upper surface of the third diaphragm 86 for protecting a thin-walled section of the third diaphragm 86, wherein the cushioning member 90 is supported by a cross-sectionally L-shaped support member 92 connected to a lower end of the stem 76. A displacement amount of the stem 76 in the direction of the arrow $X_1$ is controlled by abutment of the support member 92 against a annular step 94 of the second valve body 72. By contrast, the displacement amount of the stem 76 in the direction of arrow $X_2$ is controlled by abutment of a flange of the stem 76 against a boss 96 of the second valve body 72.

A passage 98 is formed in the second valve body 72 providing communication between the third diaphragm chamber 88 and atmosphere. On the other hand, a pilot passage 100 is formed in a cover member 52 for supplying a pilot pressure to the second diaphragm chamber 82.

The controller 32 includes a bonnet 102 assembled integrally with the first valve body 46 and second valve body 76 which make up the actuator 30, wherein a pressurized fluid supply port 119a and a pressurized fluid discharge port 119b are formed in the bonnet 102.

In the interior of the bonnet 102, there are arranged a first electromagnetic valve 104 functioning as a supply valve and controlling a pilot pressure supplied to the second diaphragm chamber 82 through pilot passage 100, a second electromagnetic valve 106 functioning as a discharge valve by discharging to the exterior a pressurized fluid supplied from the first electromagnetic valve 104, and a pressure sensor 110 for detecting the pilot pressure supplied from the first electromagnetic valve 104 and outputting a detection signal to a main control unit 108.

The first and second electromagnetic valves 104, 106 respectively are normally closed type valves, wherein by outputting current signals with respect to electromagnetic coils of the respective first and second electromagnetic valves 104, 106, valve bodies 114a and 114b are drawn in the direction of arrow $X_1$, thereby resulting in an open-valve condition.

A pressure value or the like detected in accordance with the pressure sensor 110 is displayed on a LED display device 116, and as necessary, set pressure values set by an unillustrated key input device, via connector 118, are also displayed on the LED display device 116. Further, the main control unit 108 includes an unillustrated MPU (microprocessor unit) possessing various functional means therein for performing control, evaluation, processing, computation and memory storage. Based on control signals derived from the MPU, pilot pressure supplied to the second diaphragm chamber 82 is controlled by energizing and deenergizing first and second electromagnetic valves 104, 106.

Further disposed in the bonnet 102 are a first passage providing communication between the pressurized fluid supply port 119a and the first electromagnetic valve 104, a second passage 122 providing communication between the first electromagnetic valve 104 and the second electromagnetic valve 106, a third passage 124 branching from the second passage 122 and which supplies pilot pressure to the pressure sensor 110, a pilot passage 100 branching from the second passage 122 and which supplies pilot pressure to the second diaphragm chamber 82, and a fourth passage 126 providing communication between the second electromagnetic valve 106 and the pressurized fluid discharge port 119b.

In this case, when a current signal is supplied from the main control unit 108 to the coil 112 of the first electromagnetic valve 104, the valve body 114a is displaced resulting in a valve-open condition, and making communication between the first passage 120 and the second passage 122. As a result, pressurized fluid (pilot pressure) supplied from the pressurized fluid supply port 119a is supplied to the second diaphragm chamber 82 via the first passage 120, second passage 122 and pilot passage 100.

On the other hand, when a current signal is supplied from the main control unit 108 to the coil 112 of the second electromagnetic valve 106, the valve body 114b is displaced resulting in a valve-open condition, and making communication between the second passage 112 and the fourth passage 126. As a result, pressurized fluid (pilot pressure) in the second diaphragm chamber 82 is discharged to atmosphere through the fourth passage 126 and the pressurized fluid discharge port 119b.

Figure 3:
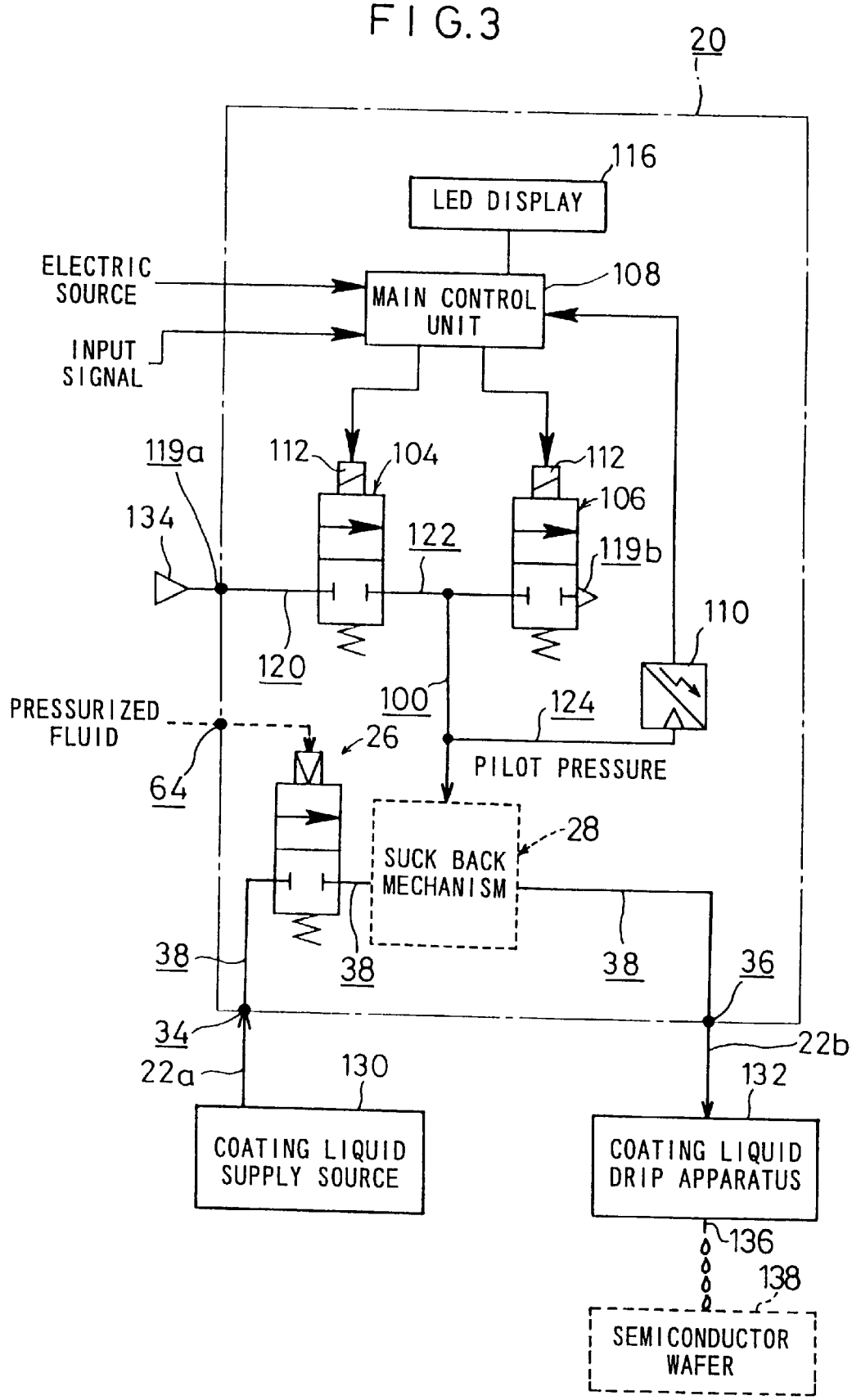
FIG. 3 is a view of a circuit structure for the suck back valve shown in FIG. 1.

The suck back valve 20, according to this embodiment, is constructed basically as described above. Next, the actions and operational effects thereof shall be described in reference to the circuit structure diagram shown in FIG. 3.

First, a coating liquid supply source 130, storing therein a coating liquid for coating a semiconductor wafer, is connected to a tube 22a which communicates with the first port 34 of the suck back valve 20, whereas a coating liquid drip apparatus 132, comprising a nozzle 136 from which a coating liquid drips onto the semiconductor wafer 138, is connected to a tube 22b which communicates with the second port 36. Further, a pressurized fluid supply source 134 is connected respectively to the pressurized fluid inlet/outlet port 64 and the pressurized fluid supply port 119a.

After undertaking such preparatory measures, the pressurized fluid supply source 134 is activated, introducing a pressurized fluid to the pressurized fluid supply port 119a, together with introducing an input signal to the main control unit 108 via an unillustrated input means. Based on the input signal, the main control unit 108 outputs an electric signal to the first electromagnetic valve 104 only, so that the first electromagnetic valve 104 is put in a valve-open state. At this time, the second electromagnetic valve 106 is deenergized and hence is in a valve-closed state.

As a result, pressurized fluid (pilot pressure) introduced from the pressurized fluid supply port 119a is supplied to the second diaphragm chamber 82 via the second passage 112 and pilot passage 100. Under action of the pilot pressure supplied to the second diaphragm chamber 82, the second diaphragm 80 flexes and presses the stem 76 in the direction of arrow $X_2$. Thus, the third diaphragm 86 connected to the lower end of the stem 76 is displaced, resulting in the state shown in FIG. 2. Further, pilot pressure supplied to the second diaphragm chamber 82 is introduced to the pressure sensor 110 through the third passage 124, and a detection signal output from pressure sensor 110 is introduced to the main control unit 108, wherein feedback control of the pilot pressure is performed.

In this manner, under action of the pilot pressure supplied to the second diaphragm chamber 82, in a state in which the second diaphragm 80 is pressed in the direction of arrow $X_2$, the ON/OFF valve 26 assumes an ON condition. More specifically, pressurized fluid from the pressurized fluid inlet/outlet port 64 is introduced to cylinder chamber 48, and the piston 50 is displaced in the direction of arrow $X_1$ in resistance to the elastic force of spring elements 54a, 54b. Accordingly, the first diaphragm 56 which is connected to the piston 50 separates from the seat 59, and ON/OFF valve 26 assumes an open state. When this happens, coating liquid supplied from the coating liquid supply source 130 flows along flow passage 38, and coating liquid drips onto the semiconductor wafer 138 through the coating liquid drip apparatus 132. As a result, a coating layer having a desired thickness is formed on the semiconductor wafer 138.

After application of a desired amount of coating liquid onto the semiconductor wafer 138 via the coating liquid drip apparatus 132, in response to a switchover action of an unillustrated directional control valve, supply of pressurized fluid with respect to the ON/OFF valve 26 is halted, and ON/OFF valve 26 assumes an OFF state. More specifically, piston 50 is displaced in the direction of arrow $X_2$ under action of the elastic force of spring elements 54a, 54b, wherein by seating of the diaphragm 56 on seat 59, supply of coating liquid to the semiconductor wafer 138 is halted, and dripping of coating liquid onto the semiconductor wafer 138 from the nozzle 136 of the coating liquid drip apparatus is suspended. In this case, because coating liquid immediately preceding that which has dripped onto the semiconductor wafer 138 remains inside the nozzle 136 of the coating liquid drip apparatus 132, there is a fear that further dripping of liquid may occur.

Figure 4:
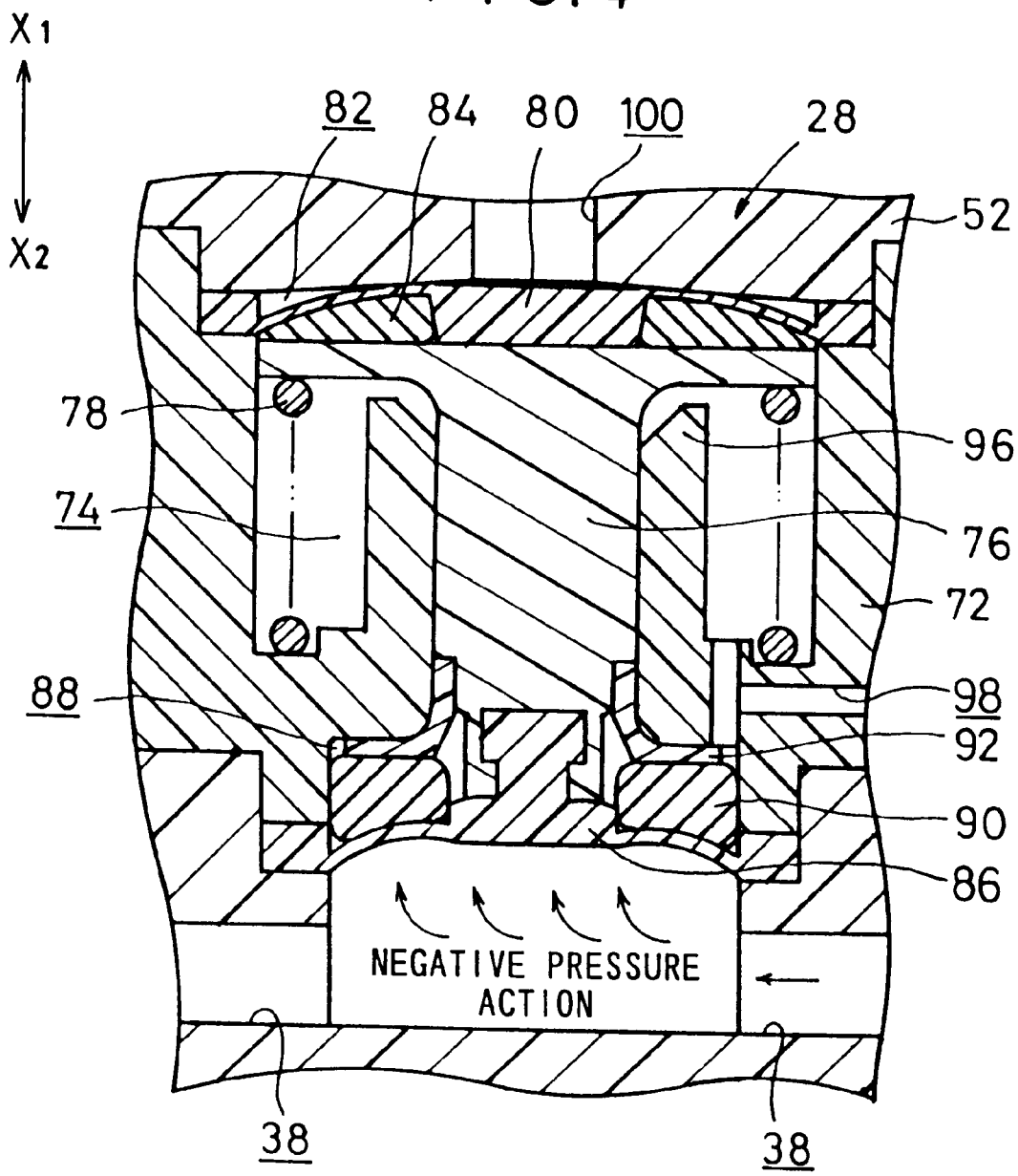
FIG. 4 is a view explaining operation of the suck back valve shown in FIG. 1.
Figure 5:
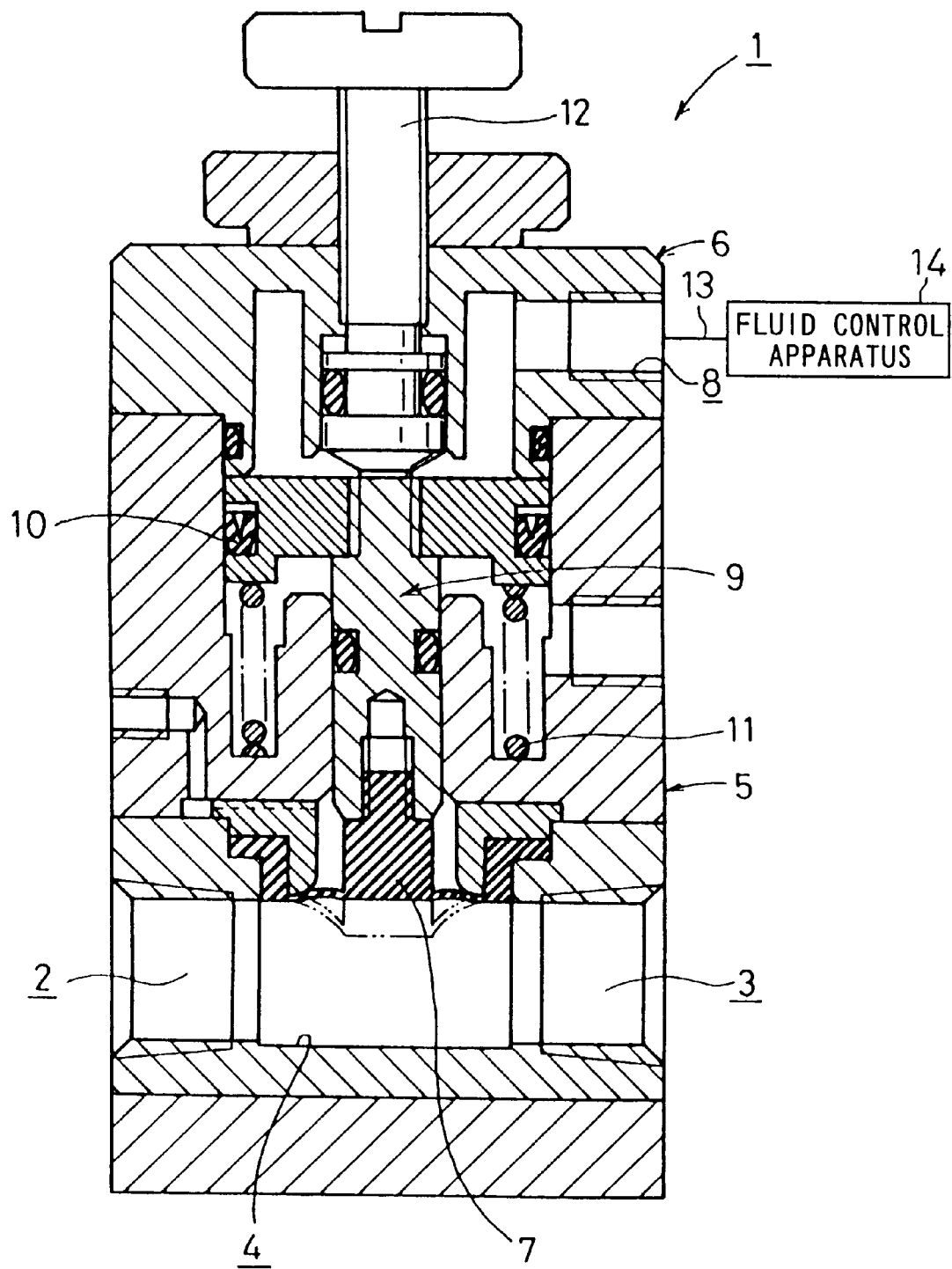
FIG. 5 is a vertical cross-sectional view of a suck back valve according to a conventional technique.

To account for such a fear, switching of the ON/OFF valve 26 from an ON state to an OFF state is detected by an unillustrated detection means, and a detection signal thereof is introduced to the main control unit 108. The main control unit 108, in synchronism with this detection signal from the detection means, issues a deactivation signal to the first electromagnetic valve 104 thereby putting the first electromagnetic valve 104 in a valve-closed state, simultaneously with issuing an activation signal to the second electromagnetic valve 106 putting the second electromagnetic valve 106 in a valve-open state. Accordingly, supply of pilot pressure to the second diaphragm chamber 82 is halted, together with discharging to atmosphere any remaining pressurized fluid in the second diaphragm chamber 82 through the fourth passage 126. When this happens, the second diaphragm 80 rises in the direction of arrow $X_1$ under action of the elastic force of spring element 78, resulting in the condition shown in FIG. 4.

More specifically, by raising the second diaphragm 80, and displacement of the third diaphragm 86 in the direction of the arrow $X_1$ in unison through the stem 76, a negative pressure action is generated. When this occurs, a predetermined amount of coating liquid inside the fluid passage 38 is sucked along the direction of the arrows shown in FIG. 4.

As a result, a predetermined amount of coating liquid which remains in the nozzle 136 of the coating liquid drip apparatus 132 is returned toward the side of the suck back valve, so that liquid dripping can be prevented from occurring with respect to the semiconductor wafer 138.

By once again activating ON/OFF valve 26 putting it in a valve-open condition, simultaneously issuing an activation signal to the first electromagnetic valve 104 from the main control unit 108 putting it in an ON state, and issuing a deactivating signal to the second electromagnetic valve 106 putting it in an OFF state, the condition shown by FIG. 1 is reached, reinitiating dripping of the coating liquid with respect to the semiconductor wafer.

With the present invention, the coupling body 40, the first valve body 46, second valve body 72 and the bonnet 102 are integrally connected, wherein the fitting 24, actuator 30 and controller 32, respectively, are assembled together integrally. Accordingly, in the present invention, unlike the conventional technique, an operation for connecting a supply pipe between the suck back valve 1 and the fluid control apparatus 14 is unnecessary, and since dedicated space need not be provided to accommodate additionally the fluid control apparatus, effective use of installation space can be achieved.

Further, as there is no need to dispose a supply pipe between the suck back valve 1 and the fluid control apparatus 14, an increase in fluid resistance can be avoided, and through first and second electromagnetic valves 104, 106 which are ON/OFF controlled electrically by main control unit 108, the pilot pressure can be controlled with good precision. As a result, it becomes possible to raise responsiveness and precision of the second diaphragm 80 operated in accordance with the pilot pressure, swiftly sucking back any coating liquid which remains inside the fluid passage 38.

What is claimed is:

1. A suck back valve, comprising:

a fitting including a fluid passage providing communication between a first port formed on one end of a coupling body and a second port formed on another end of said coupling body;

a valve actuator including a valve body formed so as to surround an outer peripheral surface of said fitting, and a suck back mechanism disposed inside said valve body for sucking a fluid inside of said fluid passage in accordance with a negative pressure action produced by a flexible member displaceable by a pilot pressure; and a controller having a bonnet connected to one side surface of said valve body, said bonnet having disposed therein a supply valve and a discharge valve, said supply and discharge valves providing respective supplying and discharging operations for increasing and reducing the pilot pressure supplied to a pilot chamber, said controller respectively energizing and deenergizing said supply valve and said discharge valve by supplying respective electric signals to said supply valve and said discharge valve, wherein said coupling body, said valve body and said bonnet are connected together as an integral body, thereby assembling together integrally said fitting, said valve actuator and said controller.

2. The suck back valve according to claim 1, said suck back mechanism extending from a pilot chamber and further comprising:

a diaphragm displaceable under action of a pilot pressure supplied to said pilot chamber;

a stem displaceably disposed in said valve body and displaceable in unison with said diaphragm;

another diaphragm connected to an end of said stem generating a negative pressure based on displacement thereof together with said stem; and a spring element for forcing said stem in a direction toward said pilot chamber.

3. The suck back valve according to claim 1, said valve body further comprising a first valve body and a second valve body, an ON/OFF valve disposed in said first valve body for opening and closing a fluid passage, said suck back mechanism being disposed in said second valve body for sucking a fluid inside said fluid passage.

4. The suck back valve according to claim 3, said suck back mechanism extending from a pilot chamber, and further comprising:

a diaphragm displaceable under action of a pilot pressure supplied to said pilot chamber;

a stem displaceably disposed in said valve body and displaceable in unison with said diaphragm;

another diaphragm connected to an end of said stem generating a negative pressure based on displacement thereof together with said stem; and a spring element for forcing said stem in a direction toward said pilot chamber.

5. The suck back valve according to claim 1, said controller including a first electromagnetic valve having a function for supplying fluid and a second electromagnetic valve having a function for discharging fluid, and further comprising:

a first passage providing communication between said first electromagnetic valve and a pressurized fluid supply port;

a second passage providing communication between said first electromagnetic valve and said second electromagnetic valve;

a pilot passage branching from said second passage for supplying a pilot pressure to said suck back mechanism;

a third passage connected to said second passage for introducing said pilot pressure to a pressure sensor; and a fourth passage providing communication between said second electromagnetic valve and a pressurized fluid discharge port.

6. The suck back valve according to claim 5, wherein said controller comprises a main control unit providing respective ON/OFF controls of said first electromagnetic valve and said second electromagnetic valve.

7. The suck back valve according to claim 6, wherein said controller further comprises a pressure sensor for detecting a pilot pressure, wherein based on detection signals derived from said pressure sensor and input to said main controller unit, said main controller unit provides feedback control of said pilot pressure.

8. The suck back valve according to claim 7, wherein said controller further comprises a display device for displaying a pressure value of the pilot pressure detected by said pressure sensor.

9. The suck back valve according to claim 1, wherein said flexible member comprises a diaphragm.

* * * * *